US011780687B2

(12) United States Patent
Franchini (10) Patent No.: US 11,780,687 B2
(45) Date of Patent: Oct. 10, 2023

(54) SEPARATION PROCESS AND PLANT FOR PARTICULATE MATTER (71) Applicant: F.M. S.R.L., Correggio (IT)

(72) Inventor: Gian Carlo Franchini, Correggio (IT)

(73) Assignee: F.M. S.R.L., Correggio (IT)

(*) Notice: Subject to any disclaimer, the term of this patent is extended or adjusted under 35 U.S.C. 154(b) by 89 days.

(21) Appl. No.: 17/328,073

(22) Filed: May 24, 2021

(65) Prior Publication Data
US 2021/0362963 A1    Nov. 25, 2021

(30) Foreign Application Priority Data

May 25, 2020   (IT) ................. 102020000012205

(51) Int. Cl.
| B65G 53/24 | (2006.01) |
| B01D 45/16 | (2006.01) |
| B04C 9/00  | (2006.01) |
| B08B 5/02  | (2006.01) |
| B08B 5/04  | (2006.01) |
| B01D 50/20 | (2022.01) |

(52) U.S. Cl.
CPC ............ *B65G 53/24* (2013.01); *B01D 45/16* (2013.01); *B01D 50/20* (2022.01); *B04C 9/00* (2013.01); *B08B 5/023* (2013.01); *B08B 5/043* (2013.01); *B04C 2009/002* (2013.01)

(58) Field of Classification Search
None
See application file for complete search history.

(56) References Cited

U.S. PATENT DOCUMENTS

| 2007/0281094 | A1 | 12/2007 | Nishio |
| 2010/0269853 | A1 | 10/2010 | Johnston et al. |
| 2018/0185889 | A1 | 7/2018 | Ishimabushi et al. |
| 2020/0086260 | A1* | 3/2020 | Marchesini .......... B01D 46/247 |

FOREIGN PATENT DOCUMENTS

| CA | 2584882       | 10/2008 |
| CN | 105 107 793   | 12/2015 |
| DE | 20 2013 001195 | 2/2013 |
| EP | 0 357 662     | 3/1990  |
| JP | H06 262518    | 9/1994  |
| JP | H07 88445     | 4/1995  |
| WO | WO 2009/156956 | 12/2009 |

* cited by examiner

*Primary Examiner* — Eric W Golightly
(74) *Attorney, Agent, or Firm* — Leason Ellis LLP (57) ABSTRACT Process and plant for particulate matter along a conveyor system of products, said plant having a collection system which sucks a carrier gas flow and demarcates, in use, a suction chamber, namely a closed volume, with said product which advances in an advancing direction on an advancing plane; the separation plant having a separation system which is connected to said collection system and gets, in use, said carrier gas flow and particulate matter; wherein said separation system separates particulate matter from the carrier gas flow.

15 Claims, 10 Drawing Sheets

SEPARATION PROCESS AND PLANT FOR PARTICULATE MATTER

CROSS-REFERENCE TO RELATED APPLICATIONS

This patent application claims priority from Italian patent application no. 102020000012205 filed on May 25, 2020, the entire disclosure of which is incorporated herein by reference.

TECHNICAL FIELD

The present invention relates to a separation process and a plant for particulate material along a conveyor system of products, in particular flat products such as slabs.

Particulate matter is the set of solid and liquid particles found in the atmosphere. Particulate matter is classified according to particle size, i.e. the equivalent aerodynamic diameter of particles suspended in a gaseous fluid. For example, coarse particles with a diameter of 10 μm or less are classified as PM-10. Coarse particles PM-10 are generated, for example, by operations such as movement/crushing/cutting of solid materials. Fine particles with a diameter of 2.5 μm or less are classified as PM-2.5 and are generated, for example, by processes such as combustion.

BACKGROUND OF THE INVENTION

In the manufacturing sector, like in the ceramics or woodworking sectors, production processes generate and disperse into the environment a significant quantity of particulate matter, in particular dust, which can have particle size varying from a few millimetres (e.g. chips) to a few microns (e.g. dust or fine ceramics).

The generation and dispersion of particulate matter in the work environment is highly damaging. In addition to fouling the work environment, particulate matter poses a threat to human health as it can be inhaled and, in the case of fine particles, absorbed.

In this regard, there are a number of regulations that set maximum permitted levels of particulate matter in an environment, such as a work environment.

In order to confine and limit the dispersion of particulate matter in the work environment, separation processes and plants are known.

Centralised separation processes and plants comprising a compressor (e.g., a fan) to which several vertical hoods are connected, each of which is positioned in a respective suction station, are known. The compressor is able to create a depression in correspondence of the suction mouth of each vertical hood. A vertical hood has the plane of the suction mouth vertically above the advancing plane of the products, i.e. the working plane. Disadvantageously, a vertical hood of known type does not allow to achieve a complete collection of the particulate matter, since it is arranged at a great distance from the advancing plane of the products.

Moreover, the upward suction depression has intrinsic limits of effectiveness, as it is necessary to overcome the force of gravity in the entire section between the product and the inlet of the suction pipe connected to the vertical hood.

A centralised separation plant of known type further comprises a single separation system in which the particulate matter is separated from the carrier gas flow.

If on the one hand the use of a single separation system simplifies the operations of collecting the particulate matter, disadvantageously this involves a significant increase in the length of the pipes and, in the case of use of separator cyclones, a reduction in the separation capacity. Consequently, known separation processes and plants are complex and expensive to manufacture and have large dimensions in the working area. In addition, known separation processes and plants are not very flexible, in other words they cannot be modified (for example the hoods cannot be modified) in a simple way.

Furthermore, separation plants called push-pull are known, these separation plants combine an air flow with a suction hood in turn connected to a separation system. The combination of a push air flow with a pull air flow allows, in fact, a significant increase in the capacity of removing the particulate matter. In these plants of known type, the air flow is transversal to the advancing direction of the products and the hood is not above the conveyor system of the products, i.e. the hood does not overhang the conveyor system. Although this solution allows achieving better performances than using vertical hoods only, some significant problems persist. In particular, the absence of overhang on the conveyor system by the hood causes a high dispersion of the particulate matter that is not collected by the hood once it is moved by the air flow. Furthermore, the orientation of the air flow transversal in respect to the advancing line does not allow the achievement of adequate efficiencies as the width of the conveyor system increases and, therefore, as the distance that the particulate matter must travel increases.

A further disadvantage of the known type separation plants is that the known type hoods have poor positioning flexibility, as they do not allow for adjustments to the inclination in respect to the sliding plane of the products.

A further disadvantage of known type separation plants is the need to design and manufacture custom-made hoods, according to the total area on which the suction is to be exercised. Known type hoods are made by bending metal sheet or by forming reinforced resins in an autoclave, which means that in the event of a change in the size of the hood, a significant modification of the manufacturing process is required, with a consequent increase in costs and a reduction in flexibility.

In addition, it is noted that due to the COVID-19 pandemic, it was necessary to sanitize environments to prevent the virus from spreading among workers.

SUMMARY OF THE INVENTION

The purpose of the present invention is to provide a separation process and a plant capable of overcoming the above mentioned drawbacks.

It is the purpose of the present invention to provide a separation process and a plant for sanitizing air in the work environment.

BRIEF DESCRIPTION OF THE DRAWINGS

According to the present invention, a process and a plant are provided as mentioned in the appended claims.

The invention will now be described with reference to the attached drawings, which show non-limiting examples of embodiment thereof.

DETAILED DESCRIPTION OF THE INVENTION

Figure 1:
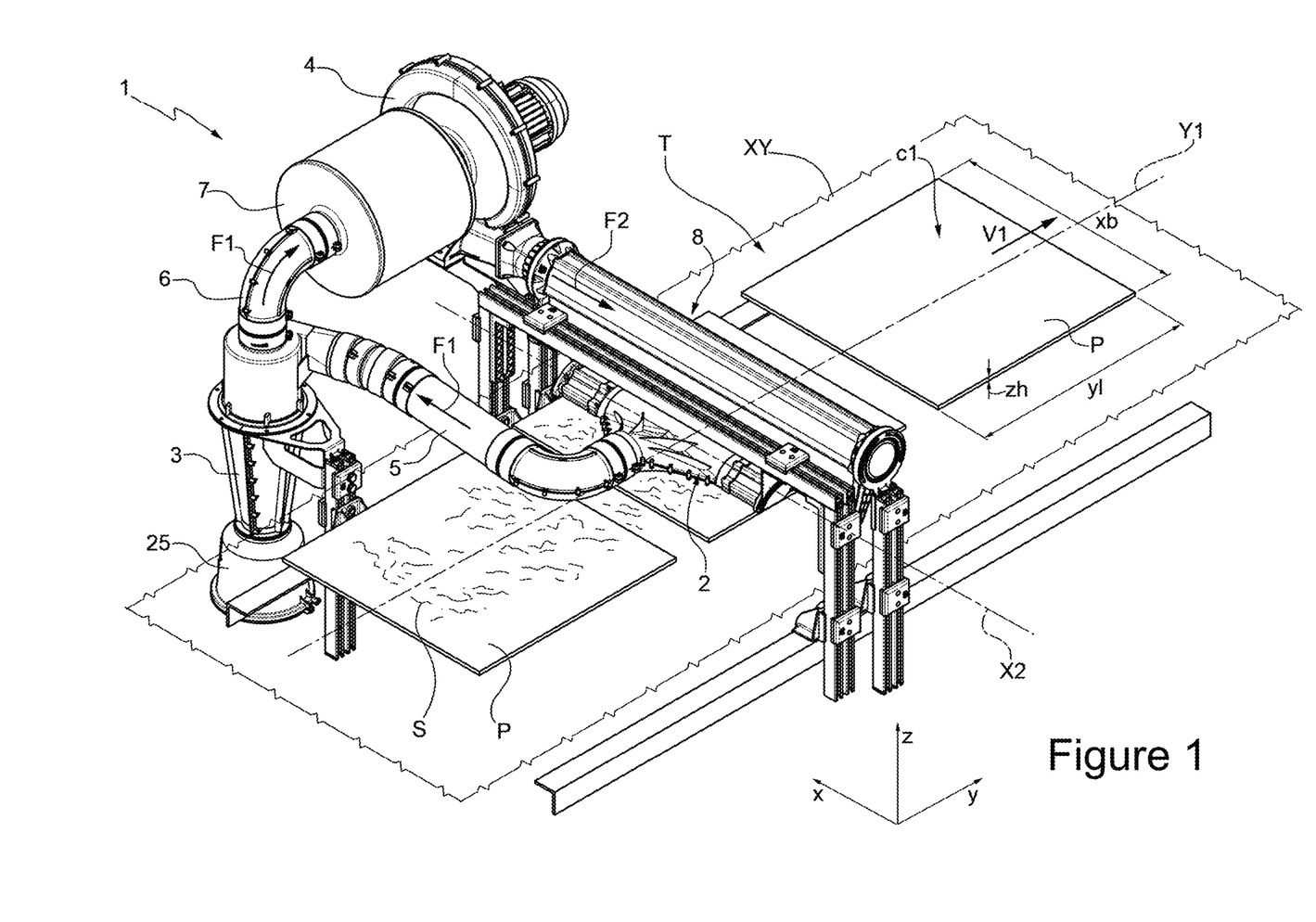
FIG. 1 is a perspective view of a first embodiment of a separation plant according to the present invention.
Figure 2:
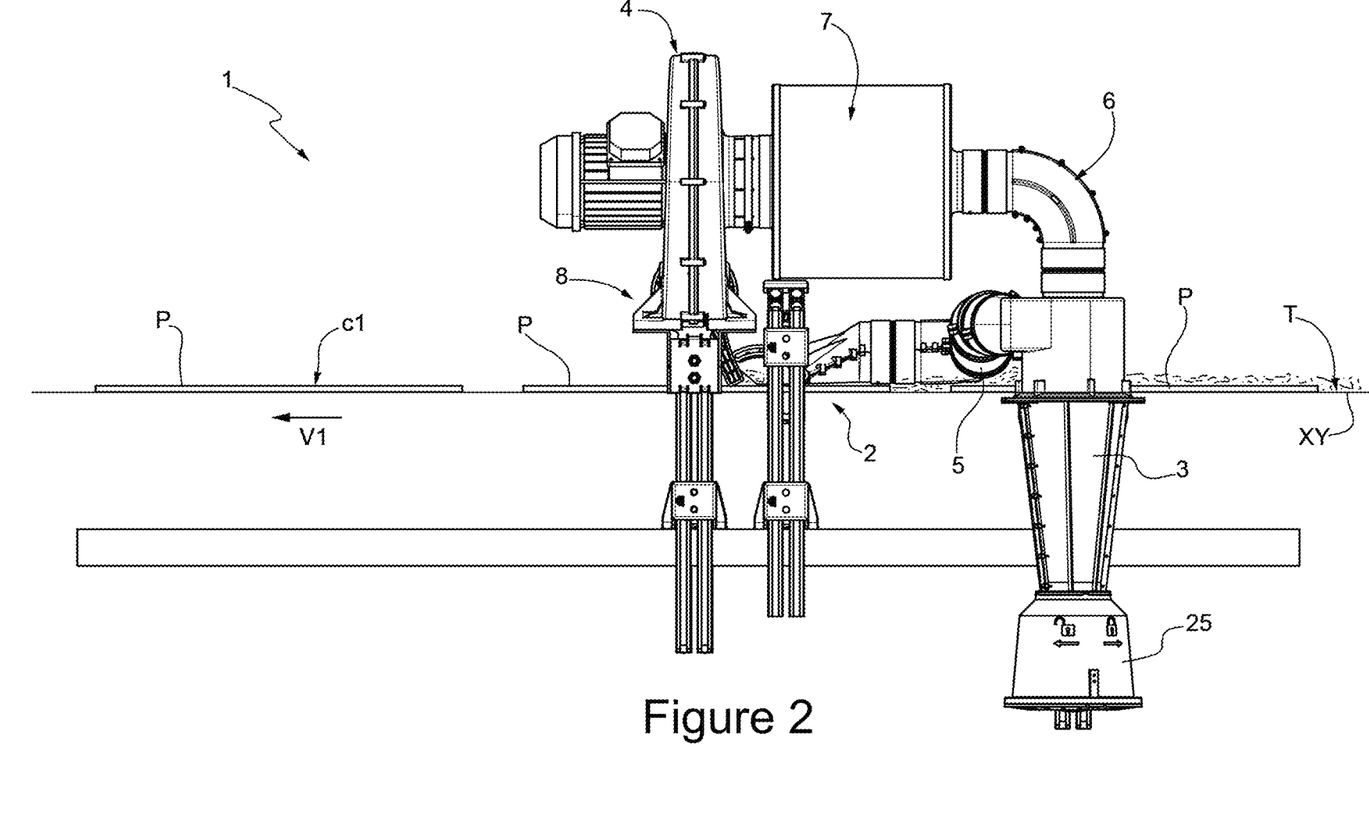
FIG. 2 is a side view of the separation plant of FIG. 1.

In FIG. 1, 1 generally denotes a separation plant 1 according to the present invention.

The separation plant 1 is configured to separate the particulate matter S along a conveyor system T of products P, i.e. articles, on an advancing plane XY defined by two axes X and Y perpendicular to each other.

According to the shown example, the conveyor system T extends along a longitudinal axis Y1 and the advancing direction V1 of the products P is parallel to the longitudinal axis Y1.

According to the example shown in the figures, the products P are flat bodies, namely thin slabs having a length y1, that is, the extension along the longitudinal axis Y, and a width xb, that is, the extension along the axis X, much greater than the thickness zh, that is, the extension along an axis Z perpendicular to the advancing plane XY.

The products P have an upper surface c1 substantially parallel to the advancing plane XY. Without losing generality, the products P may have different shapes and sizes and may not be flat.

It is noted that hereafter, the advancing plane XY is used as a reference for expressions such as horizontal (parallel to the advancing plane XY), vertical (perpendicular to the advancing plane XY) or the like.

According to what is shown in the figures, the products P are slabs (such as tiles). The products P may be made, for example, of ceramic material, composite material, wood, veneered material or the like.

Generally, during the processing of products P along the conveyor system T, dust is generated, which forms the particulate matter S together with other elements that may already be present in the environment. Along the conveyor system T there may be, in a known and non-shown manner, one or more workstations, for example a cutting, grinding, polishing or similar station.

The separation plant 1 according to the present invention may be installed at any position along the conveyor system T. In other words, the separation plant 1 may be installed along the conveyor system T either at a workstation or at any other position downstream or upstream of a workstation.

Advantageously, as will be better shown below, the separation plant 1 sucks in and separates the particulate matter S from the environment of the conveyor system T. Advantageously, the separation plant 1 is configured to sanitize the air of the environment of the conveyor system T so as to prevent the propagation of viruses or bacteria into the environment, as will be better shown below.

The separation plant 1 comprises a collection system 2, which is configured to suck in the particulate matter S from the environment using a carrier gas flow F1 (FIG. 3), and a separation system 3 which is configured to separate the particulate matter S from the carrier gas flow F1.

The separation plant 1 further comprises a compressor 4, in particular a fan, connected to the collection system 2. The compressor 4 generates a depression so as to extract through the collection system 2 some gas, which constitutes the carrier gas flow F1, from the environment of the conveyor system T.

Advantageously, the separation system 3 is interposed between the collection system 2 and the compressor 4. In particular, the separation plant 1 comprises: a suction conduit 5, fluidically connecting the collection system 2 with the separation system 3, and an outlet conduit 6 fluidically connecting the separation system 3 with the compressor 4. According to the shown example, the separation system 3 is a cyclone separator. Without losing generality and according to non-shown variants the separation system 3 may be of a different type.

Figure 3:
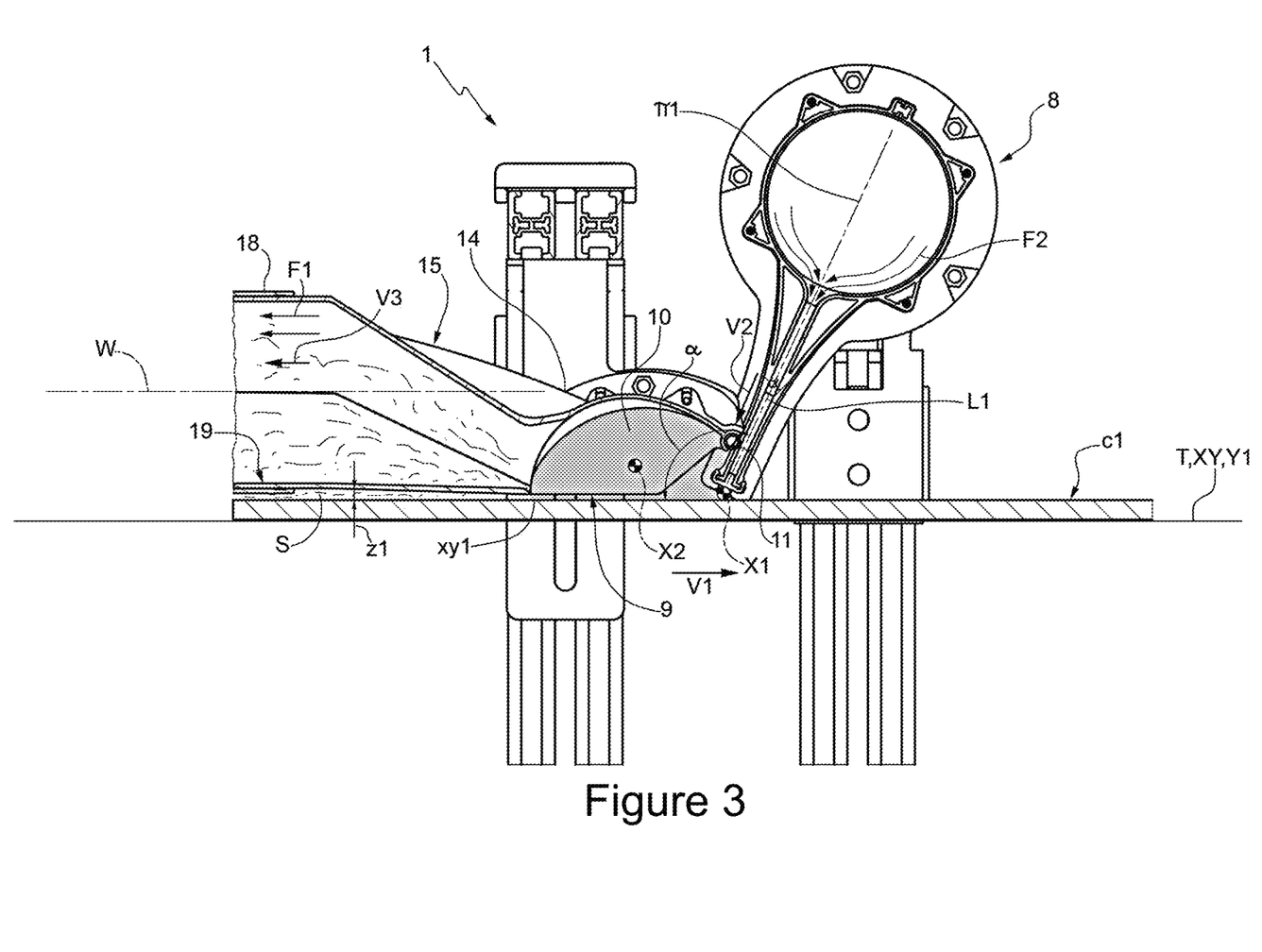
FIG. 3 shows in section a detail of FIG. 2.

According to what is shown in detail in FIG. 3, the collection system 2 has a suction mouth 9 which lies on a plane xy1 substantially parallel to the advancing plane xy of the product P. Advantageously, the distance z1 between the plane xy1 and the upper surface c1 of the product P is extremely limited. Advantageously, the distance z is less than or equal to 2.5 cm.

Advantageously, the separation plant 1 further comprises a filtering device 7 arranged along the outlet conduit 6 and interposed between the separation system 3 and the compressor 4.

Advantageously, the filtering device 7 is also capable of filtering out viruses or bacteria carried by the particulate matter S. In particular, the filtering device 7 comprises a HEPA filter (High Efficiency Particulate Air filter) according to Standard EN 1822-2009 (EU), typically used for controlled atmospheres in clean rooms.

Advantageously, the separation plant 1 comprises a diffuser 8 installed downstream of the compressor 4 and getting a pushing flow F2 from the compressor 4 itself. Advantageously, the diffuser 8 is installed downstream of the collection system 2 and is configured to generate an air blade L1 going in a direction V2, which is against the advancing direction V1 of the product P (FIG. 3).

The diffuser 8 is configured to blow an air blade L1 (FIG. 3) substantially parallel to a plane π1. The plane π1, i.e., the air blade L1, is inclined in respect to the plane xy1 of the suction mouth 9 by an angle of inclination α. The plane π1, i.e., the air blade L1, is incident with the longitudinal axis Y1. The plane π1 intersects with the plane xy1 along a straight line X1 parallel to the axis X.

Advantageously, the air blade L1 impacts, in use, on the product P so as to cause the detachment of any dust particles S that have not separated from the product P under the action of the extraction of the carrier gas flow F1.

The angle of inclination α is such that, once detached, the particulate matter S is directed towards the suction mouth 9.

Advantageously, the angle of inclination α is greater than 90°. In particular, the angle of inclination α is ranging between 90° and 180°.

The carrier gas flow F1 has a component of horizontal motion V3 with direction opposite to the advancing direction V1 of the product P. In other words, the carrier gas flow F1 is against the advancing direction V1 of the product P. This allows to add, advantageously, the separation action of the air blade L1 in combination with the extraction of the carrier gas flow F1 obtaining a complete separation of the dust particles S from the product P. In this way, the separation plant 1 has an extremely high suction efficiency of the particulate matter S with values that can exceed 90-95%.

Advantageously, the collection system 2 and the diffuser 8 are side by side so as to demarcate with the upper surface c1 of the product P a substantially closed suction chamber 10.

The only communication passage between the suction chamber 10 and the outside is given by the distance z1 between the plane xy1 of the suction mouth 9 and the upper surface c1 of the product P. Ideally, the distance z1 tends to be zero, i.e. to be as small as possible. A minimum distance z1 is due to prevent the collection system 2 from rubbing against the upper surface c1 of the product P and, thus, to avoid potential damage to the upper surface c1 by rubbing.

In other words, the suction chamber 10 is substantially a closed volume.

Advantageously, the air chamber 10 allows to confine in a closed volume either the pushing action of the air blade L1 or the extraction action of the carrier gas flow F1. In this way, the efficiency of the separation plant 1 is optimized either in terms of the power required for operation (extremely limited) or in terms of the percentage of particulate matter S sucked in.

According to what is shown in detail in FIG. 3, the collection system 2 comprises a sheath 11 which, in use, is arranged abutting against a respective wall (or seat) of the diffuser 8. In this way, the gasket 8 hermetically closes the air chamber 10 along the connection area between the collection system 2 and the diffuser 8.

Figure 4:
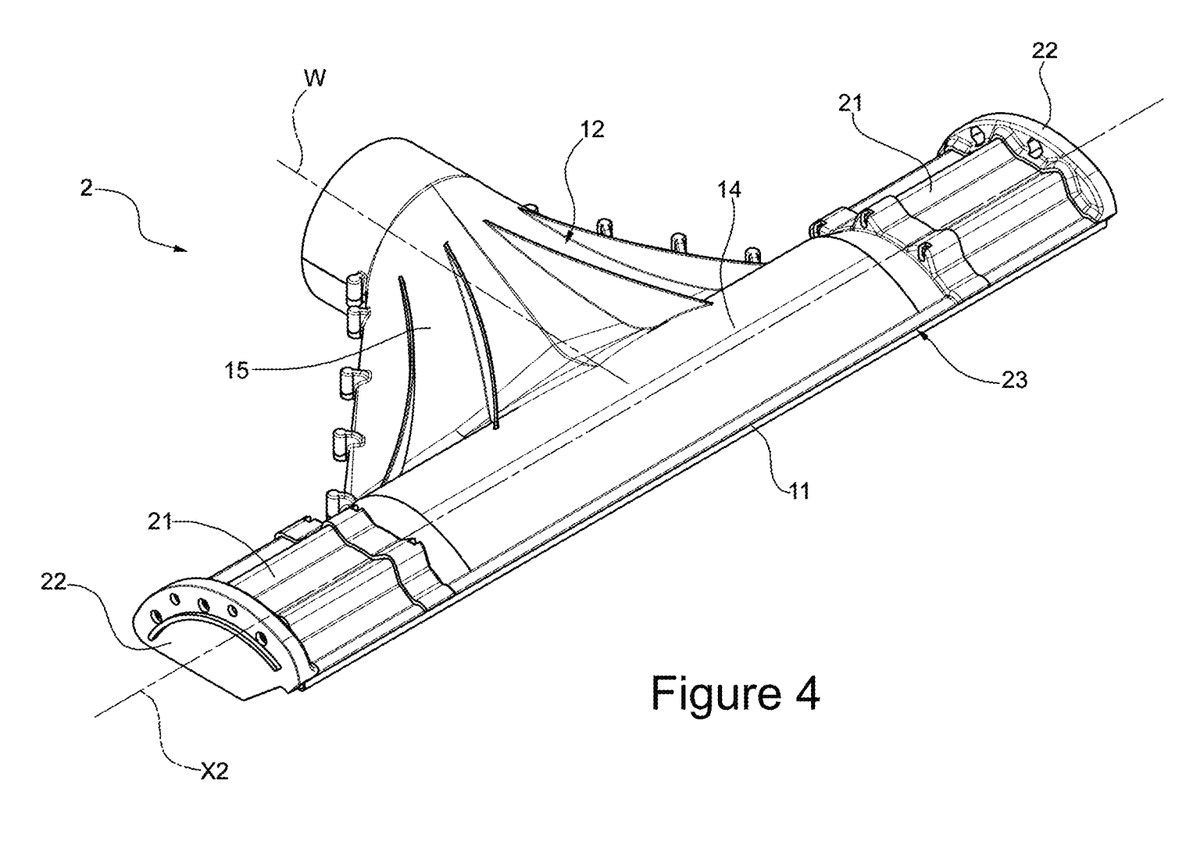
FIG. 4 is a side view of a detail of FIG. 1.
Figure 5:
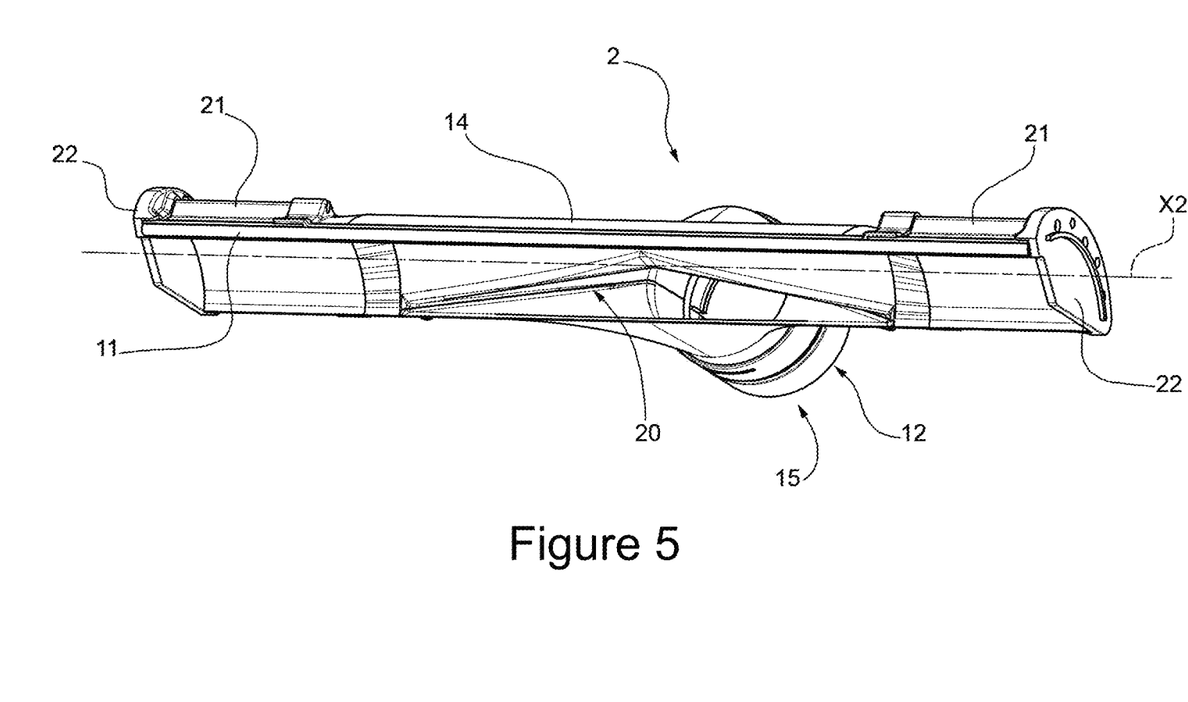
FIG. 5 is a front view of FIG. 4.

According to what is shown in FIGS. 4 and 5, the collection system 2 comprises a hood 12 configured to be connected to the suction conduit 5.

The hood 12 is a hollow body. The hood 12 comprises a wall 14 which delimits a suction area A (shown in FIGS. 6A and 6B), which constitutes, at least in part, the suction chamber 10 and is exposed in use to the particulate matter S to be sucked. Advantageously, the extension of the suction area A is as small as possible so as to locally concentrate the action of the carrier gas flow F1. The wall 14 is bentcurved. According to the example shown in the figures, the wall 14 has a longitudinal axis X2 which is transversal, in particular perpendicular, to the advancing direction V1. According to the example shown in FIG. 6B, the longitudinal axis X2 is an axis of symmetry of the wall 14. The hood 12 also comprises a connection 15 configured to connect the wall 14 to the suction conduit 5.

The connection 15 is internally hollow and has a suction cavity 19 that is configured to put the suction area A in communication with the suction conduit 5. The connection 15 is divided in a shaped profile portion 16 and in a coupling portion 18. The connection 15 is fluidly connected with the suction area A through an opening 20. The shaped profile portion 16 is interposed between the wall 14 and the coupling portion 18.

Advantageously, the shaped profile portion 16 is such as to generate a Venturi effect in the suction cavity 19 and by the opening 20. Along the shaped profile portion 16, the suction cavity 19 has a variable cross-sectional passage area. The passage area of the suction cavity 19 increases from the opening 20 towards the coupling portion 18. Advantageously, the profile of the passage area of the suction cavity 19 is also variable along the shaped profile portion 16.

According to the shown example, the passage area of the suction cavity 19 is substantially triangular in correspondence of the opening 20 (i.e., the opening 20 is substantially triangular in shape). The passage area of the suction cavity 19 is substantially circular at the coupling portion 18. The coupling portion 18 is substantially a tubular body having a longitudinal axis W.

Advantageously, the Venturi effect generated by the shape of the shaped profile portion 16 allows to amplify the depression of the carrier gas flow F1 and, consequently, the suction capacity of the hood 12.

Advantageously, since the suction area A is delimited by the wall 14 which is a curved wall of reduced height, the overall dimensions of the hood 12 are limited.

In particular, the hood 12 allows the extraction force of the hood 12 to be concentrated and localized in an area.

In other words, the hood 12 is substantially flat.

This increases the flexibility and ease of installation with a significant reduction in overall dimensions.

Advantageously, the suction area A is delimited by a single wall 14 which satisfies predefined technical specifications. This allows the hood 12 to be used as a central module of a more complex structure of the collection system 2 as will be better shown below. The fact that the hood 12 has a fixed geometry and dimensions allows technologies such as injection moulding of polymeric materials to be used for the realization thereof, which despite the high costs for the equipment allows a high productivity.

Advantageously, the hood 12 is made of polymeric material, this allows reducing the weight of the hood 12 by facilitating its transportation and installation.

The collection system 2 also comprises lateral wings 21 to adapt the width, i.e. the extension along the axis X, of the collection system 2 itself to the effective width of the conveyor system T.

The lateral wings 21 are not made in one piece with the wall 14, in other words they are distinct bodies each of which is connected to a respective longitudinal end of the wall 14. Each lateral wing 21 is a laminar body having a shape substantially similar to that of the wall 14. In other words, each lateral wing 21 constitutes an extension of the wall 14 along the longitudinal axis X2.

Advantageously, each lateral wing 21 is made by extrusion. In this way, for example, a piece of extrusion can be cut at will to obtain a lateral wing 21 of any length.

In other words, it is possible to replace a lateral wing 21 with another chosen within a group of lateral wings 21 differing from each other in length, i.e. extension along the longitudinal axis X2.

This allows the width of each collection system 2 to be adapted to the width of the conveyor system T according to the longitudinal extension of each lateral wing 21.

Advantageously, in this way, the extension along the longitudinal axis X2 of the collection system 2 is substantially equal to the width of the conveyor system T. In this way, it is ensured that the suction chamber 10 is closed, in use, inferiorly by the product P so as to reduce any air leakage.

According to the shown example, each lateral wing 21 may be releasably connected to the wall 14. In this way it is possible to change the width even of a collection system 2.

The collection 2 comprises two caps 22 (FIG. 4), each of which laterally closes a free end of a respective lateral wing 21.

Figure 7:
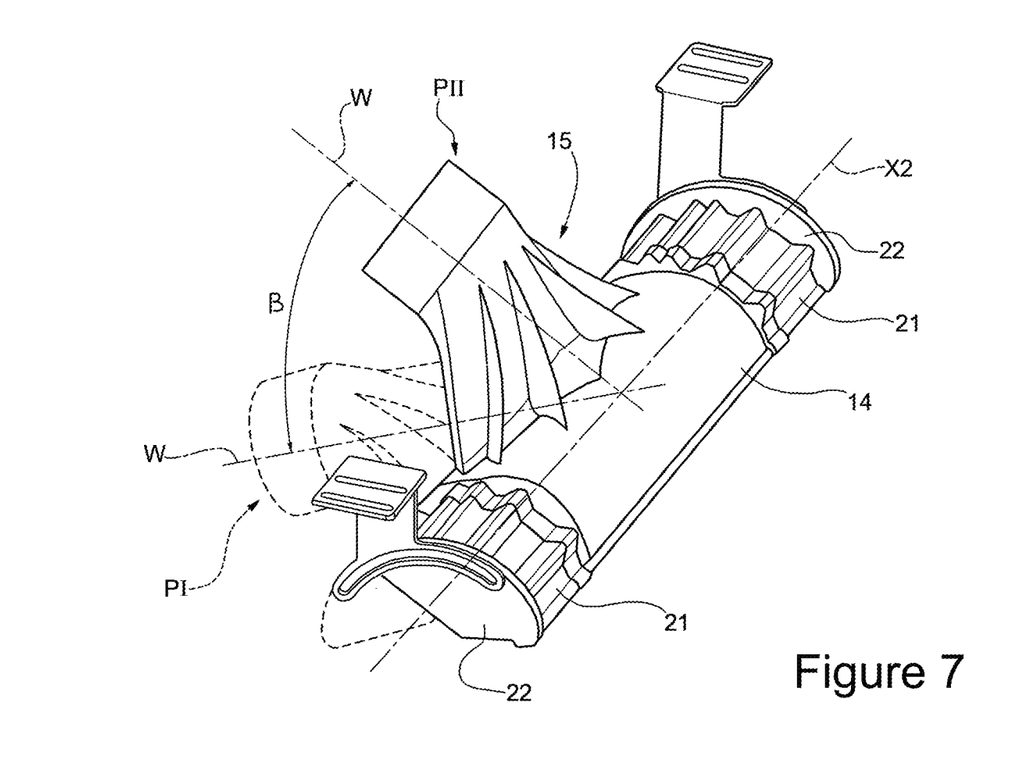
FIG. 7 is similar to FIG. 4 and shows the detail of FIG. 4 in different operating configurations.

According to the variant shown in FIG. 7, the connection 15 is mounted rotatable in respect to the wall 14. In other words, the longitudinal axis W of the coupling portion 18 may be rotated about the longitudinal axis X2 of the hood 12. According to the example shown in FIG. 7, the connection 15 may assume any position between a flattened position PI, in which the longitudinal axis W is substantially parallel to the plane xy1 to a raised position PII in which the longitudinal axis W is inclined at an angle $\beta$ in respect to the flattened position PI. For example, the acute angle is ranging between 0° and 60°. Advantageously, the fact that the connection 15 can be rotated about the longitudinal axis X2 allows for a greater flexibility in installation and adaptability of the collection system 2 even to existing conveyor systems T or with reduced installation space.

The collection system 2 has a leading edge 23 and longitudinally delimits the collection system 2 itself. The leading edge 23 is substantially parallel to the longitudinal axis X2.

Figure 6A:
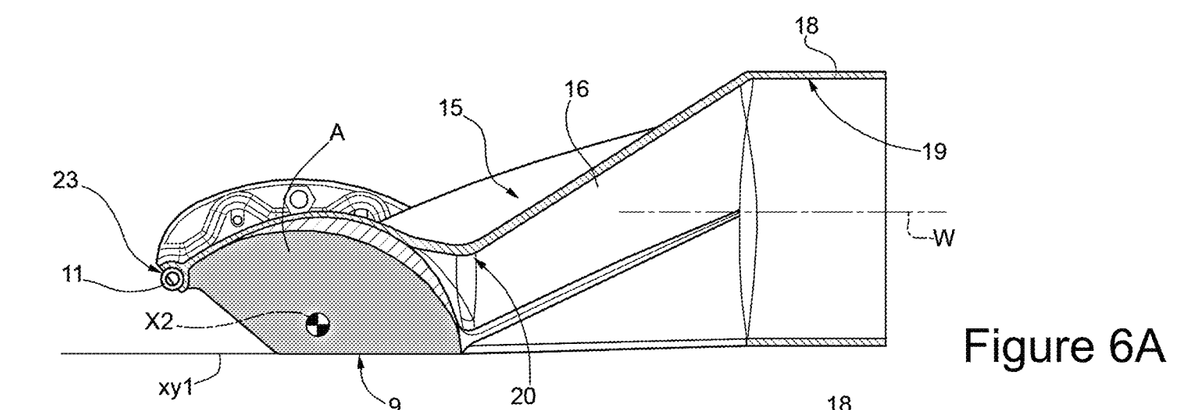
FIG. 6A is a section of the detail of FIG. 4

According to the example shown in FIG. 6A, the leading edge 23 is spaced apart from the plane xy1 of the suction mouth 9. In this case the sheath 11 is applied to the leading edge 23, which is configured to come into contact in use, against the distributor 8 so as to close the suction chamber 10 at the top.

Figure 6B:
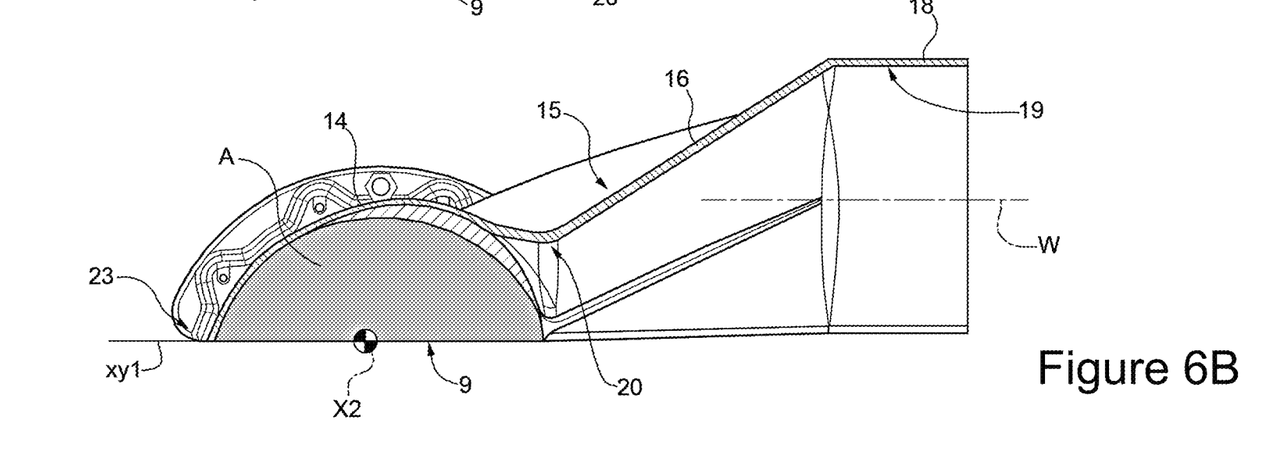
FIG. 6B is similar to FIG. 6A and shows a variant of the same detail.

According to the example shown in FIG. 6B, the collection system 2 has the shape of a semi-cylinder, the leading edge 23 lies on the plane xy1 of the suction mouth 9. In this case, the suction area A corresponds to the suction chamber 10. This second configuration shown in FIG. 6B is suitable for the embodiment of the variant of the separation plant 1 shown in FIG. 8.

Figure 8:
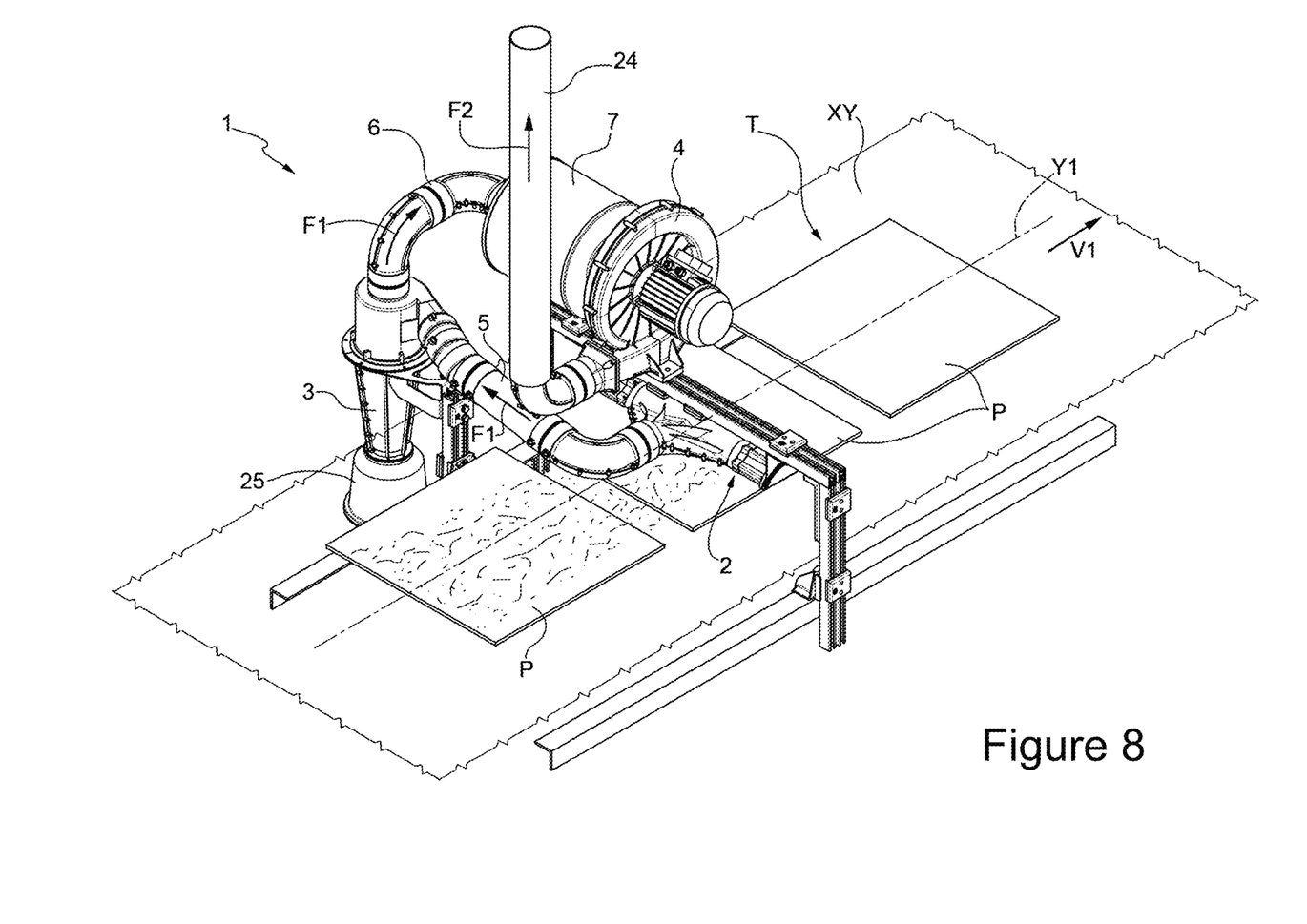
FIG. 8 is a perspective view of a further embodiment of a separation plant according to the present invention.

FIG. 8 shows a variant of the separation plant 1 according to the present invention. The components in common with the solution described above are considered contained herein and maintain the same numbering and are not repeated for brevity's sake.

In the example shown in FIG. 8, unlike what has been shown previously, the separation plant 1 is without the diffuser and the compressor 4 is connected to a discharge conduit 24 and conveys the pushing fluid F2 inside the discharge conduit 24. The discharge conduit 24 may be connected, for example, to a central air collection pipe (not shown).

Figure 9:
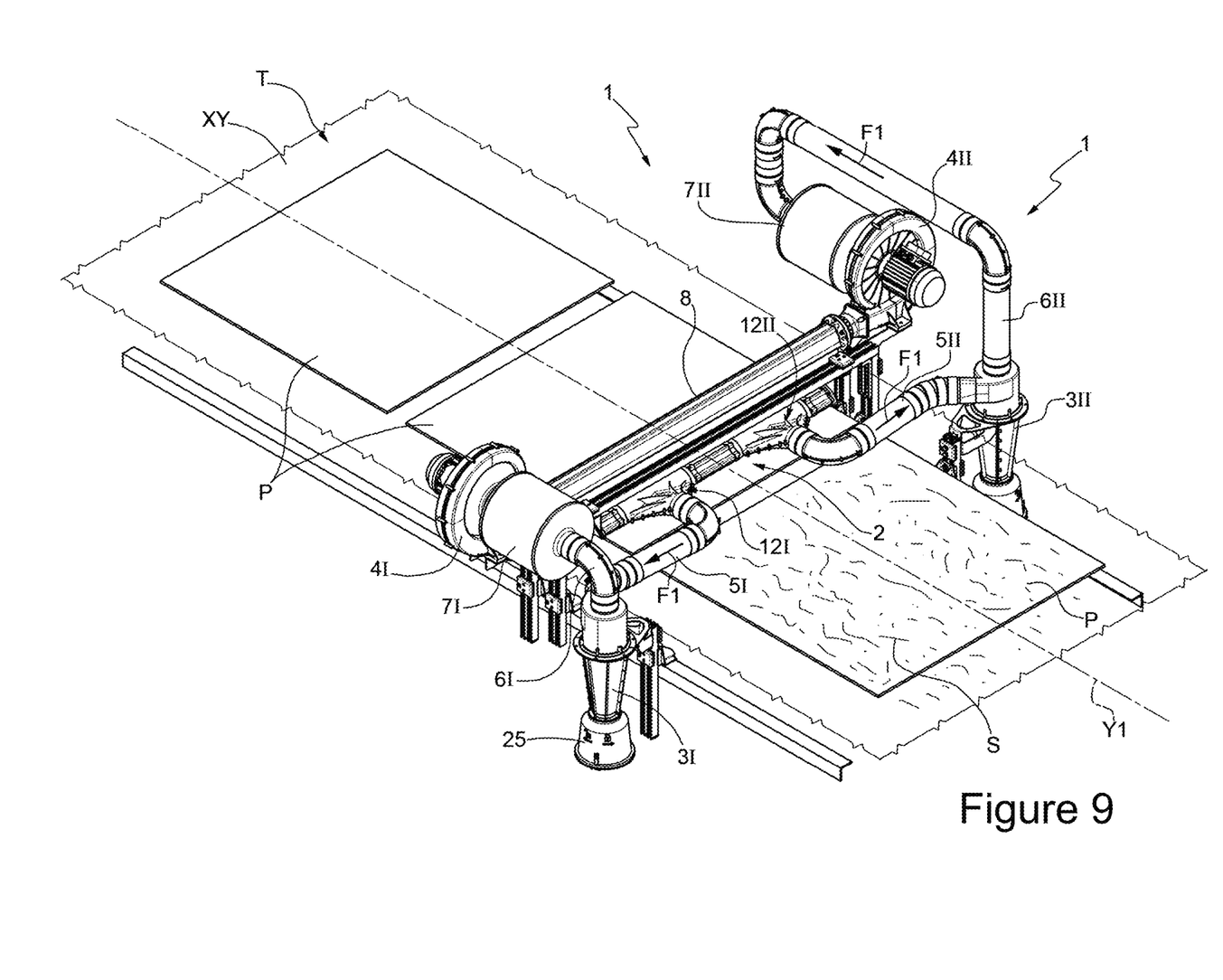
FIG. 9 is a perspective view of a variant of FIG. 1.

FIG. 9 shows a variant of the separation plant 1 of FIG. 1, the components being substantially doubled and installed on opposite sides of the conveyor system T. In FIG. 9, the components of the plant 1 maintain the same numbering and bear the endings I and II for the components to the left and, respectively, to the right of the conveyor system.

According to what is shown in FIG. 9, the plant 1 comprises two collection systems 12I and 12II side by side and communicating so as to form a single suction chamber 10. Each collection system 12I and 12II is connected to a respective separation system 3I and 3II and a ventilation machine 4I and 4II. A respective filtering device 7I and 7II is arranged between each separation system 3I and 3II and the respective ventilation machine 4I and 4II. Advantageously, according to what is shown in FIG. 9, with the same type of components it is possible to cover a conveyor system T with a larger width and to guarantee a complete suction of the dust S. Moreover, thanks to the adaptability of the length of the lateral wings 21 of each hood 12I and 12II, the separation plant 1 of the type described above can be adapted to conveyor lines T of any width.

In the example of FIG. 9, the separation plant 1 comprises a single diffuser 8 of substantially doubled length and fed by both compressors 4I and 4II.

According to a variant not shown, the separation plant 1 may comprise doubled components placed side by side but not communicating with each other, i.e. the hoods 12 may be placed side by side but not communicating with each other and the diffuser 8 instead of being of doubled length may be divided into two distinct bodies.

Figure 10:
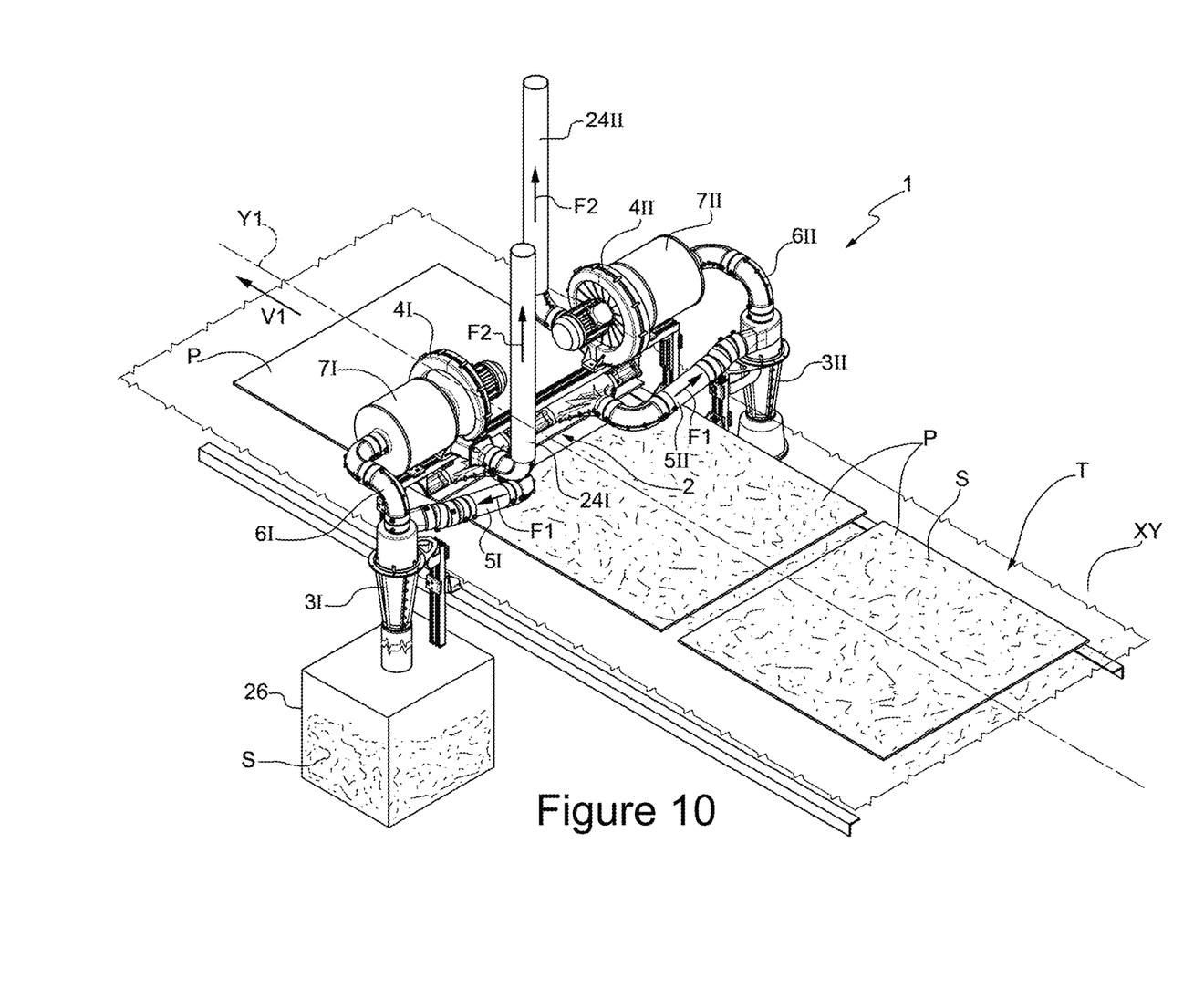
FIG. 10 is a perspective view of a variant of the separation plant according to the present invention.

FIG. 10 shows a variant of the separation plant 1 shown in FIG. 8 in which the components are substantially doubled like in the example shown in FIG. 9.

In use, the compressor 4 is activated so as to generate a depression such as to cause the air from the external environment to be sucked in through the collection system 2 generating a carrier gas flow F1. The carrier gas flow F1 entrains the particulate matter S within the collection hood 2 and into the suction conduit 5.

A dirty product P, i.e. on which material (dust, chips or the like) is deposited, which must be separated from the product P and constitutes at least part of the particulate matter S, advances in the advancing direction V1 and is made to slide below the separation hood 2.

By advancing below the separation hood 2, the product P inferiorly closes the suction area A of the separation hood 2 so as to inferiorly demarcate the suction chamber 10 (FIG. 3).

Within the suction chamber 10 the carrier gas flow F1 entrains the particles as particulate matter S sucking it into the suction conduit 5.

According to what shown in FIG. 3, advantageously, in case the separation plant 1 comprises a diffuser 8, the suction chamber is demarcated on at least one side by an air blade L1 blown from the diffuser 8 itself. The air blade L1 helps to separate material adhering to the product P and making it dirty. Advantageously, according to what is shown in FIG. 3, the air blade L1 is substantially perpendicular to the advancing direction V1 and is inclined in respect to the plane xy1 of the suction mouth 9 by an angle α greater than 90°, in this way the air blade L1 in addition to separating the material deposited on the product P allows to direct the particulate matter S towards the suction mouth 9 increasing the efficiency of the separation plant 1.

Advantageously, according to what is shown in FIG. 1, the diffuser 8 is fed by a pushing flow F2 generated by the same compressor 4 that generates the carrier gas flow F1. In this way, advantageously, a closed air cycle of reduced dimensions and extremely efficient is generated, which requires modest powers for its operation.

The particulate matter S is sucked along the suction conduit 5 and within the separation system 3.

Within the separation system 3 the particulate matter S is divided by the fluid (air) that constitutes the carrier gas flow F1. According to the example shown in the figures, the separation system 3 is a cyclone separator and the particulate matter S is made to accumulate within a special container 25 integrated into the separation system, or within a disposal bag or a pipe leading to a centralised tank 26 (the latter hypothesis is schematized by way of example in table 10).

Advantageously, the carrier gas flow F1 passes through the filtering device 7. In particular, the filtering device 7 comprises a HEPA-type filter, in this way it is possible to sanitize the carrier gas flow F1 by eliminating any viruses or bacteria and contributing to the sanitization of the environments. The filtering device 7 may comprise multiple degrees of filtration so as to allow the complete removal of particulate matter S from the carrier gas flow F1.

According to the variant shown in FIG. 8, the compressor 2 is connected at the outlet to a discharge conduit 24. In this case, instead of generating a closed air cycle, the pushing flow F2 is conveyed to a discharge, as it could be a centralised air discharge plant. This ensures that air that is not sucked into the work environment is not recirculated locally.

Advantageously, according to FIGS. 9 and 10 the separation plant 1 is modular, so that components can be duplicated in case of particularly large conveyor systems T.

Advantageously, the separation plant 1 of the type described above can be easily adapted to any type of conveyor system. The separation plant 1 of the type described above is easy to install and takes up little space.

The separation plant 1 of the type described above requires reduced power compared to conventional separation plants.

Advantageously, the hood 12 of the collection system 2 can be made with standard components produced with large-scale production processes, for example moulding or extrusion. This allows economies of scale to be applied and reduces the cost of the separation plant 1.

The separation plant 1 of the type described above is independent and does not need to be connected to expensive centralised plants.

The collection system 2 has extremely reduced dimensions and is substantially flattened on the conveyor system T. This allows the collection system 2 to be installed in substantially any position.

Advantageously, the coupling portion 18 that is tubular and inclined in respect to the hood 12 allows a connection to be made with the suction conduit 5 that is inclined in respect to the advancing plane XY. This makes it possible to reduce the vertical dimensions of the separation plant 1 and to be able to adapt the collection system 2 also to already existing conveyor systems T with structural constraints.

The invention claimed is:

1. A separation process for particulate matter along a conveyor system for products, which advance in an advancing direction on an advancing plane; said process comprising the steps of:
   suction of a carrier gas flow by means of a collection system;
   demarcation of a suction chamber, namely a closed volume, between said collection system and one or more products;
   extraction of particulate matter within said suction chamber by means of said carrier gas flow;
   removal of the particulate matter from the carrier gas flow by means of a separation system the separation system being connected to said collection system and getting, in use, said carrier gas flow and the particulate matter;
   wherein the separation system comprises a blowing device which blows, in use, an air blade and laterally demarcates said suction chamber together with the collection system and the one or more products; wherein said air blade is transversal to said advancing direction; said air blade going in a second direction against said advancing direction; said collection system having a longitudinal axis which is transversal to the advancing direction; wherein said carrier gas flow is parallel to the advancing plane; and wherein the carrier gas flow is against the advancing direction of the one or more products.

2. A separation process according to claim 1, wherein a compressor sucks in input the carrier gas flow and blows in output a pushing flow, which is directed to the blowing device to blow said air blade.

3. A separation process according to claim 1, wherein during the suction step the carrier gas flow flows in a third direction opposite to the advancing direction.

4. A process according to claim 1, wherein said air blade is parallel to a first plane; wherein said collection system has a suction mouth lying in a second plane (xy1) parallel to the advancing plane; wherein the first plane, in particular the air blade, is inclined in respect to said advancing plane by an angle of inclination; wherein said angle of inclination is greater than 90°, in particular the angle of inclination is ranging between 90° and 180°.

5. A separation process according to claim 1, wherein a filtering device filters the carrier gas flow, by means of a HEPA filter.

6. A separation process according to claim 1, wherein said collection system comprises a hood which comprises, in turn, a bent wall delimiting a suction area; said suction area having an opening and being fluidly connected with a suction duct by means of said opening; wherein the extraction step comprises generating a Venturi effect by said opening.

7. A separation process according to claim 1, wherein the suction step is realized by means of two side by side collection systems; said collection systems being fluidly connected to each other.

8. A separation plant for particulate matter along a conveyor system for products, which advance in an advancing direction on an advancing plane; the separation plant comprising a collection system configured to suck a carrier gas flow; the separation plant comprising a separation system, which is connected to said collection system and gets, in use, said carrier gas flow and the particulate matter; wherein said separation system is configured to separate the particulate matter from the carrier gas flow; said separation plant being characterized in that the collection system demarcates, in use, a suction chamber, namely a closed volume, together with one or more products and the separation system; the separation system comprising a blowing device which blows, in use, an air blade and laterally demarcates said suction chamber together with the collection system and the one or more products; wherein said air blade is transversal to said advancing direction; said air blade going in a second direction against said advancing direction; said collection system having a longitudinal axis which is transversal to the advancing direction; wherein said carrier gas flow is parallel to the advancing plane; and wherein the carrier gas flow is against the advancing direction of the one or more products.

9. A separation plant according to claim 8, wherein said collection system has a suction mouth lying in a second plane parallel to the advancing plane; wherein the first plane, in particular the air blade, is inclined in respect to the advancing plane by an angle of inclination around an axis perpendicular to the advancing direction; wherein said angle of inclination is greater than 90°.

10. A separation plant according to claim 8 and comprising a compressor, which sucks in input the carrier gas flow through said collection system and blows in output a pushing flow, which is directed to the blowing device to blow said air blade.

11. A separation plant according to claim 10 and comprising a filtering device, which filters, in use, the carrier gas flow; said filtering device is interposed between the separation system and the compressor.

12. A separation plant according to claim 8 and comprising two side by side collection systems.

13. A separation plant according to claim 9, wherein said angle of inclination is ranging between 90° and 180°.

14. A separation plant according to claim 11, wherein the filtering device is a HEPA filter.

15. A separation plant according to claim 12 wherein, said collection systems being fluidly connected to each other.

\* \* \* \* \*